Aug. 7, 1928.
A. PARKE ET AL
1,679,681
AUTO SIGNAL
Filed Jan. 20, 1927
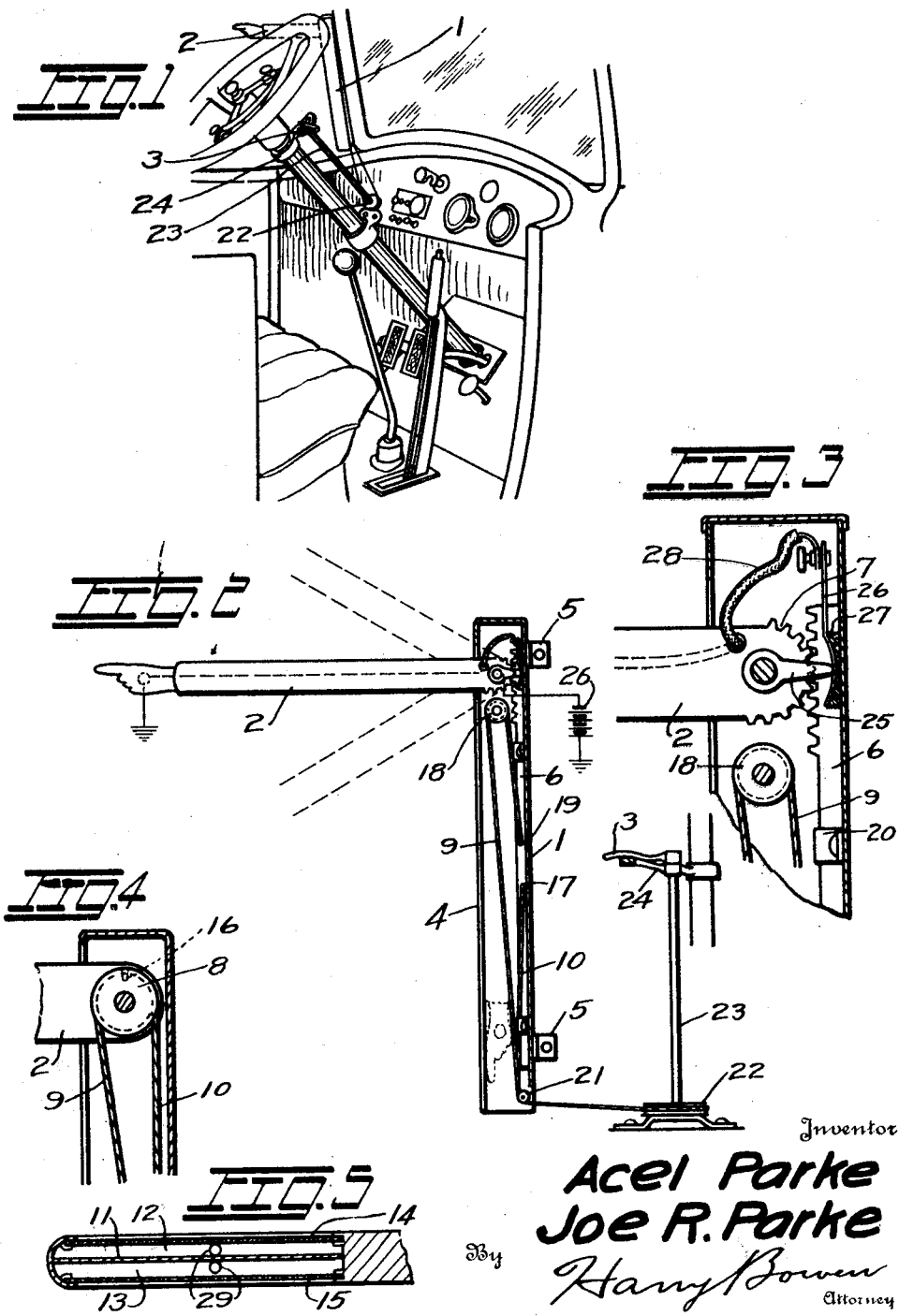
Inventor
Acel Parke
Joe R. Parke
By Harry Bowen
Attorney Patented Aug. 7, 1928.

1,679,681

UNITED STATES PATENT OFFICE.

ACEL PARKE AND JOE R. PARKE, OF SEATTLE, WASHINGTON.

AUTO SIGNAL.

Application filed January 20, 1927. Serial No. 162,401.

The invention is a direction signal for motor vehicles which may be placed on the outside of the vehicle and readily operated from the inside.

The object of the invention is to provide a direction signal for motor vehicles that may readily be attached to the edge of the windshield, or to the side of a car and readily operated from the inside.

Another object of the invention is to provide a motor vehicle direction signal which is operated by a positive movement in both directions.

A further object of the invention is to provide a direction signal for motor vehicles that will resemble the hand of an operator.

A still further object of the invention is to provide a direction signal which is of a simple and economical construction and which may be readily installed.

With these ends in view the invention embodies, a signal comprising an arm with a partitioned hand at the outer end, a casing for enclosing the arm, means within the casing through which the arm may be operated and a lever located at a remote point for controlling the arm operating mechanism.

Other features and advantages of the invention will appear from the following description, taken in connection with the drawings, wherein:

Figure 1 is a view showing the device as it would appear in use.

Figure 2 is a sectional view showing the general assembly of the device.

Figure 3 is an enlarged detail showing the upper portion of the casing shown in Figure 2.

Figure 4 is another similar detail showing an alternate design.

Figure 5 is a sectional plan through the hand at the outer end of the arm.

In the drawings the device is shown as it would be made, wherein numeral 1 indicates the casing, numeral 2 the arm and numeral 3 the operating lever.

The casing 1 may be made in a rectangular shape as shown with its lower end open and a slot 4 in the outer side. This casing may be provided with clips 5, as shown in Figure 2, for holding it to a windshield or the like, however it is understood that any other suitable means may be used for holding it in place.

In the upper end of the casing is a a rack 6 that meshes with gear teeth 7 on the inner end of the arm 2, and it will be observed that as the rack 6 is moved upward or downward it will readily move the arm upward or downward. It is also understood that any other suitable means may be used for operating the arm 2 and it will be noted that a sheave or drum, as indicated by the numeral 8 may be placed on the inner end of the arm 2 and the two cords 9 and 10 passing over it may pass around a similar sheave or drum at a remote point so that the arm may be directly operated by the cords. The latter design is shown in detail in Figure 4. The arm may be of any suitable construction and may be provided with a hand, or other indicating device at the outer end. The hand in the design shown is made as shown in Figure 5, with a partition 11 extending through it, so that it is divided into two compartments 12 and 13. A green glass 14 may be placed in the open side of the compartment 12, which is on the forward side of the device and a red glass 15 may be placed in the compartment 13 that is on the rear of the device. When in operation then the device will show red towards the rear and green towards the front. Each compartment may be provided with a lamp, as shown or the partition 11 may be omitted and only one lamp used. It is also understood that lenses of any other color may be used and these lenses may be held in the outer end of the arm in any suitable manner, or arranged in any suitable shape.

In the design shown in Figure 4 the cords 9 and 10 are connected to the sheave 8 and may be held to the sheave by a pin 16 so that the arm may be directly operated by the cords, however, in the designs shown in Figures 2 and 3, the cord 10 may be connected to the lower end of the rack 6 at the point 17 and the cord 9 may pass upward over a pulley 18 and be connected to the rack 6 at the point 19. It will therefore be observed that as either of these cords are pulled they will move the rack upward or downward and operate the arm. The rack may be supported against the back of the casing 1 and if desired may be held by bearings or clips, as indicated by the numeral 20. The cords 9 and 10 pass around the pulleys 21 at the lower end of the casing and from this point they may extend through any suitable course to another sheave or drum 22 that may be located at any convenient point. In the design shown this sheave is located on the instrument board adjacent the steering wheel and is provided with a shaft 23 with the operating lever 3 located at its upper end. A bracket 24 may be arranged to act as a guide for the lever 3 and it will be observed that as the lever 3 is moved, it will move the cords 9 and 10 and cause the arm 2 to move upward or downward, as may be desired. The guide 24 may be provided with graduations, as shown, to indicate the stop positions of the lever.

The inner end of the arm 2 is provided with a contact point 25 that engages a bar 26 that is insulated from the casing by insulation 27 and connected by a wire 28 to the lights 29 at the outer end of the arm. The lights may be grounded to the arm and the lever 25 also grounded through a battery 26, as shown, to complete the circuit.

It will be understood that other changes may be made in the construction without departing from the spirit of the invention, one of which changes may be in the design or arrangement of the casing, another may be in the design or arrangment of the lever 3 and still another may be in the use of other means for operating the arm in the casing from the lever.

The construction will be readily understood from the foregoing description. To use the device it may be installed as shown in Figure 1, however, it is understood that the casing 1 may be located on a fender or at the rear of the car or at any other suitable point. It will readily be observed that by operating the lever 3 the arm 2 may be raised from its normal position in the casing to any suitable position.

Having thus fully described our invention, what we claim as new and desire to secure by Letters Patent, is:

In a signal of the class described, a casing, an arm pivotally mounted in the upper end of the casing, a gear segment on the inner end of the arm, a rack meshing with the said gear segment and slidably mounted in the casing, a pulley in the upper end of the said casing, a cord passing over the pulley and attached to the rack, the said cord passing from the pulley and out of the lower end of the casing, other pulleys in the lower end of the casing over which the cord passes, a pulley located at a remote point around which the said cord also passes, the said cord passing from the said pulley back to the said casing, into the lower end thereof and attached to the lower end of the rack, and suitable means for rotating the pulley which is located at a remote point to move the cords to move the rack and operate the arm.

In testimony whereof we affix our signatures.

ACEL PARKE.
JOE R. PARKE.